United States Patent
Radai et al.

(10) Patent No.: US 10,948,286 B2
(45) Date of Patent: Mar. 16, 2021

(54) SYSTEM FOR AND A METHOD OF MEASURING USING A HANDHELD ELECTRONIC DEVICE

(71) Applicant: My Size Israel 2014 Ltd., Airport City (IL)

(72) Inventors: Michal Miriam Radai, Ra'anana (IL); Meni Menashe Itzhak, Rosh Ha'ayin (IL)

(73) Assignee: MY SIZE ISRAEL 2014 LTD., Airport City (IL)

( * ) Notice: Subject to any disclaimer, the term of this patent is extended or adjusted under 35 U.S.C. 154(b) by 280 days.

(21) Appl. No.: 15/755,280

(22) PCT Filed: Aug. 18, 2016

(86) PCT No.: PCT/IL2016/050905
§ 371 (c)(1),
(2) Date: Feb. 26, 2018

(87) PCT Pub. No.: WO2017/033181
PCT Pub. Date: Mar. 2, 2017

(65) Prior Publication Data
US 2018/0245913 A1     Aug. 30, 2018

Related U.S. Application Data

(60) Provisional application No. 62/208,912, filed on Aug. 24, 2015.

(51) Int. Cl.
*G01B 21/02*     (2006.01)
*G01C 22/00*     (2006.01)
(Continued)

(52) U.S. Cl.
CPC ............ *G01B 21/02* (2013.01); *G01C 22/00* (2013.01); *G01P 15/00* (2013.01); *G06F 1/1694* (2013.01); *G06F 3/017* (2013.01); *G06F 3/0346* (2013.01)

(58) Field of Classification Search
None
See application file for complete search history.

(56) References Cited

U.S. PATENT DOCUMENTS 9,239,950 B2 *   1/2016   Fletcher ............. G06K 9/00375
9,741,135 B2 *   8/2017   Shen ........................ G06T 7/62
(Continued)

FOREIGN PATENT DOCUMENTS

CN     102192727 A     9/2011
CN     103383253 A     11/2013
(Continued)

*Primary Examiner* — Lina M Cordero
(74) *Attorney, Agent, or Firm* — Browdy and Neimark, PLLC

(57) ABSTRACT

The present disclosure provides a method of measuring a path over a 3-dimensional object using a handheld electronic device comprising an acceleration sensor. The method comprises using a processor for: obtaining acceleration measurements of the handheld electronic device while the handheld electronic device is traversed over the path in a first direction, thereby obtaining acceleration plots for 3 dimensions for the first direction; identifying the start and end point of the movement; and integrating between the start and end points of the movement to find the length.

24 Claims, 8 Drawing Sheets

(51) Int. Cl.
*G06F 1/16* (2006.01)
*G06F 3/01* (2006.01)
*G06F 3/0346* (2013.01)
*G01P 15/00* (2006.01)

(56) References Cited

U.S. PATENT DOCUMENTS

| | | | |
|---|---|---|---|
| 9,762,793 B2* | 9/2017 | Ackley | H04N 5/23222 |
| 9,897,434 B2* | 2/2018 | Ackley | G01B 11/00 |
| 10,060,729 B2* | 8/2018 | Laffargue | G01B 11/25 |
| 2006/0259269 A1 | 11/2006 | Binder | |
| 2007/0215413 A1 | 9/2007 | Tyni et al. | |
| 2014/0018094 A1* | 1/2014 | Oren | G01S 19/53 |
| | | | 455/456.1 |
| 2014/0100813 A1* | 4/2014 | Showering | G01P 15/00 |
| | | | 702/141 |
| 2014/0114604 A1* | 4/2014 | Zhang | A61B 5/1116 |
| | | | 702/141 |
| 2015/0027200 A1 | 1/2015 | Akiyama | |
| 2016/0363992 A1* | 12/2016 | Welti | G06F 3/012 |

FOREIGN PATENT DOCUMENTS

| | | |
|---|---|---|
| DE | 4222373 A1 | 1/1994 |
| FR | 2317631 A1 | 2/1977 |
| JP | 2013-190265 A | 9/2013 |
| WO | 2004/018971 A1 | 3/2004 |
| WO | 2007/107465 A1 | 9/2007 |

\* cited by examiner

SYSTEM FOR AND A METHOD OF MEASURING USING A HANDHELD ELECTRONIC DEVICE

TECHNOLOGICAL FIELD

The present disclosure relates generally to handheld electronic devices and more particularly to using such devices for measuring a path length.

BACKGROUND

Taking measurements is a longstanding challenge. Measurements of a certain to object or space may be needed for comparison with the measurements of another object or space that may be located at a separate location. For example, an item, e.g., an article of clothing or piece of furniture, may be presented online, over the Internet, and in some examples, via a web browser on a phone, personal computer, television and/or other Internet connected device without the option of measuring the item in person to determine how well the object will fit, e.g., on a person or in a certain space in a room, that also needs to be measured.

SUMMARY OF THE INVENTION

The present disclosure relates to a method of measuring a path length using a handheld electronic device comprising an acceleration sensor. The presently disclosed method may be useful to enable measurement of a part of the body and/or available clothing, using for example a smart-phone.

According to an aspect of the presently disclosed subject matter there is provided a method of measuring a path over a 3-dimensional (3-D) object using a handheld electronic device comprising an acceleration sensor. The method includes the procedures of using a processor for obtaining acceleration measurements of the handheld electronic device while the handheld electronic device is traversed over the path in a first direction, thereby obtaining acceleration plots for 3 dimensions for the first direction; identifying the start and end point of the movement; and integrating between the start and end points of the movement to find the length.

In addition to the above features, the method according to this aspect of the presently disclosed subject matter can optionally comprise one or more of features (i) to (xxi) below, in any desired combination or permutation:

i. the method includes obtaining acceleration measurements in a second direction, thereby obtaining acceleration plots for 3 dimensions for the second direction.

ii. the second direction is symmetrically opposite to the first direction.

iii. the second direction is substantially the same as the first direction.

iii. the method includes identifying a point substantially in the middle between the two measurements and splitting the measurement into two portions at the middle point.

iv. the method includes identifying the start and end point of the movement for the second portion.

v. the method includes integrating between the start and end points of the movement for the second portion to find the length.

vi. the method includes calculating a final length based on the length of the first portion and the length of the second portion.

vii. identifying the start and end point of the movement is done using at least one type of weight type.

viii. identifying the start and end point of the movement for the second measurement is done using at least one type of weight type.

ix. the weight type used for the second portion is different than the weight type used for the first portion.

x. the weight type used for the second portion is substantially the same weight type used for the first portion.

xi. the weight type includes any one of standard deviation; slope; and total acceleration.

xii. calculating a final length based on the two lengths is done by averaging.

xiii. the method includes using the length of the first portion and the length of the second portion for an indication of quality measurement.

xiv. the method includes measuring orientation with the help of an orientation sensor.

xv. the method includes calibrating the acceleration measurements to compensate for the orientation potential inaccuracy.

xvi. the method includes measuring acceleration with the help of the acceleration sensor.

xvii. the method includes calibrating the handheld electronic device to True North or Magnetic North.

xviii. the method includes receiving user input indicative of a starting and an ending of a traversing movement of the handheld electronic device over the path.

xix. the handheld electronic device is a smart-phone.

xx. the method includes using angles data and orientation data to compensate the acceleration measurements for the effect of gravity.

xxi. the method includes transforming the measurement data into binary data to identify the start and end point of the movement.

According to another aspect of the presently disclosed subject matter there is provided a non-transitory computer-readable media storing computer readable instructions. The non-transitory computer-readable media storing computer readable instructions, when executed by a handheld electronic device traversed over a path on a 3-dimensional object to be measured, cause the handheld electronic device to measure the length of the path by: obtaining acceleration measurements of the handheld electronic device while the handheld electronic device is traversed over the path in a first direction, thereby obtaining acceleration plots for 3 dimensions for the first direction; identifying the start and end point of the movement; and integrating between the start and end points of the movement to find the length.

According to another aspect of the presently disclosed subject matter there is provided a handheld electronic device configured to measure a path on a 3 dimensional object. The handheld electronic device includes: an acceleration sensor configured to sense an acceleration of the handheld electronic device; computer memory; and a processor operatively coupled to the memory and to the acceleration sensor. The memory includes instructions for causing the processor to obtain acceleration measurements of the handheld electronic device while the handheld electronic device is traversed over the path in a first direction, thereby obtaining acceleration plots for 3 dimensions for the first direction; identify the start and end point of the movement; and integrate between the start and end points of the movement to find the length.

According to another aspect of the presently disclosed subject matter there is provided a measuring module for a handheld electronic device. The measuring module is configured to measure a path on a 3-dimensional object and includes: a user interface configured to receive user input indicative of a starting and an ending of a traversing movement of the handheld electronic device over the path; a data receiver unit configured to obtain from an acceleration sensor, acceleration plots of the handheld device, the acceleration plots being indicative of an acceleration of the handheld electronic device while the handheld electronic device is traversed over the path in a first direction, thereby obtaining acceleration plots for 3 dimensions for the first direction; a data processing unit configured to: identify the start and end point of the movement for each of the two portions; and integrate between the start and end points of the movement to find the length. The measuring module includes an output unit configured to output the final length to a user.

The non-transitory computer-readable media storing computer readable instructions, handheld electronic device, and measuring module disclosed in accordance with the presently disclosed subject matter can optionally comprise one or more of features (i) to (xxi) listed above with respect to the method, mutatis mutandis, in any desired combination or permutation.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
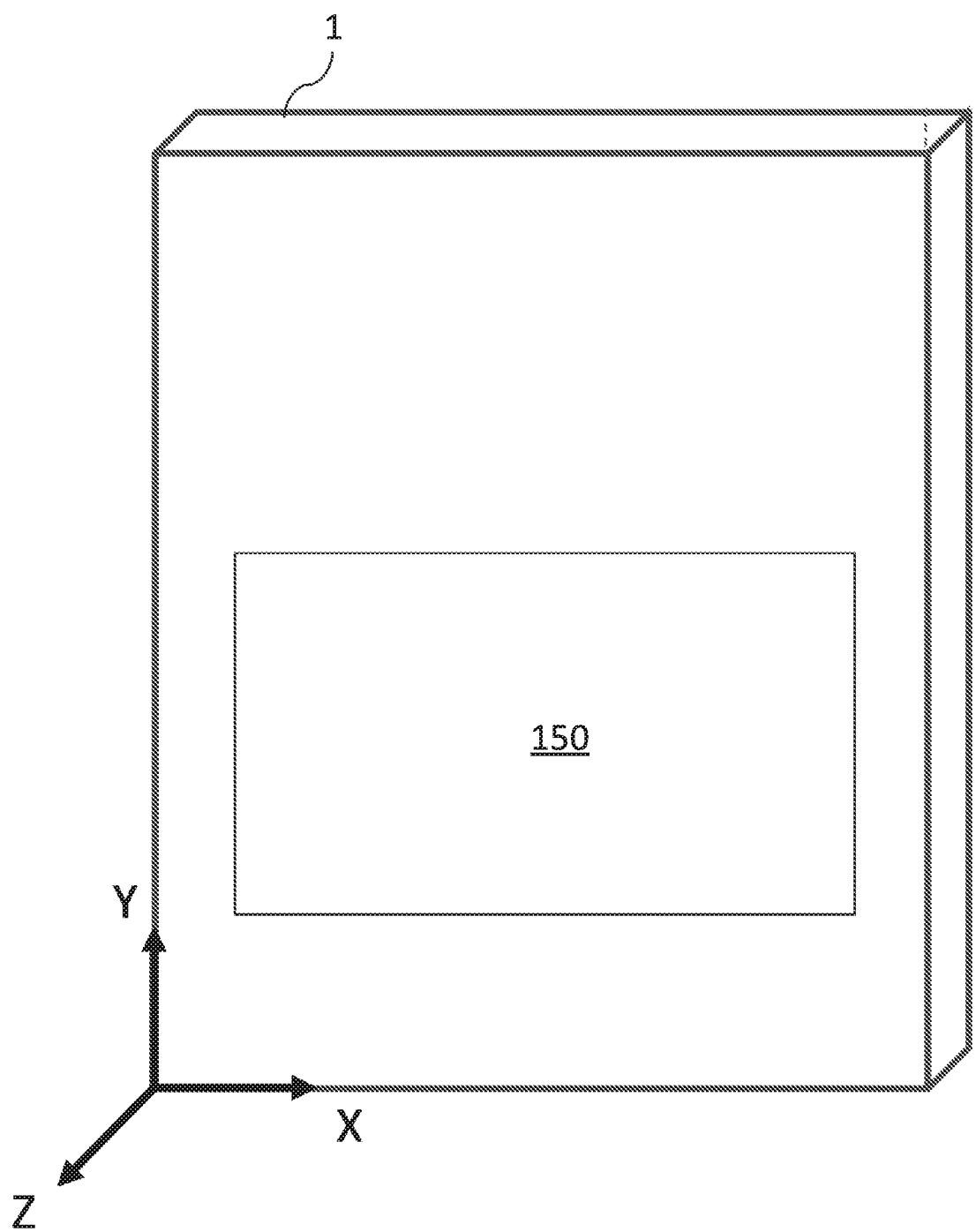
FIG. 1A is a functional block diagram schematically representing a handheld electronic device configured to measure a path length, according to embodiments of the present disclosure.

Described herein are some examples of systems and methods useful for measuring the length of a path on a 3-D object.

In the present application, the following terms and their derivatives may be understood in light of the below explanations:

The term path may refer to a straight and/or curved line.

The term traversing may be understood as referring to a straight and/or curved movement of the handheld electronic device from a starting point to an ending point, the handheld electronic device being moved substantially in one direction parallel to the path. In some examples, the handheld electronic device may be slid on the path from the starting point to the ending point. In some examples, the handheld electronic device may be hovered over the path. In some examples, the handheld electronic device may be partially hovered over the path and partially in contact with the path. In some examples the handheld electronic device may be traversed from a starting point to an ending point over a path and then back again from the ending point to the starting point substantially over that path in the opposite direction. In some examples, the handheld electronic device may be slid on the path from the starting point to the ending point and then again from the starting point to the ending point on that path.

In view of the nature of the traversing movement it is understood that a sensed acceleration of interest may substantially be a straight and/or curved acceleration as projected on the path. In other words, the acceleration of interest may be a projection of the acceleration vectors on the path. Furthermore, the traversing movement may be such that the handheld electronic device is stopped at the starting point and at the ending point and back again at the starting point.

In the following detailed description, numerous specific details are set forth in order to provide a thorough understanding of the subject matter. However, it will be understood by those skilled in the art that some examples of the subject matter may be practiced without these specific details. In other instances, well-known methods, procedures and components have not been described in detail so as not to obscure the description.

As used herein, the phrase "for example," "such as", "for instance" and variants thereof describe non-limiting examples of the presently disclosed subject matter. Reference in the specification to "one example", "some examples". "another example". "other examples, "one instance", "some instances", "another instance", "other instances", "one case", "some cases", "another case", "other cases" or variants thereof means that a particular described feature, structure or characteristic described in connection with the embodiment(s) is included in at least one example of the presently disclosed subject matter. Thus the appearance of the same term does not necessarily refer to the same example.

It should be appreciated that certain features, structures and/or characteristics of the presently disclosed subject matter, which are, for clarity, described in the context of separate examples, may also be provided in combination in a single example. Conversely, various features, structures and/or characteristics of the presently disclosed subject matter, which are, for brevity, described in the context of a single example, may also be provided separately or in any suitable sub-combination.

Unless specifically stated otherwise, as apparent from the following discussions, it is appreciated that throughout the specification discussions utilizing terms such as "measuring", "obtaining", "identifying", "splitting", "integrating", "calculating", "using", "taking", "normalizing", "calibrating", "finding", "receiving". "storing" or the like, may refer to the action(s) and/or process(es) of any combination of software, hardware and/or firmware. For example, these terms may refer in some cases to the action(s) and/or process(es) of a programmable machine, that manipulates and/or transforms data represented as physical, such as electronic quantities, within the programmable machine's registers and/or memories into other data similarly represented as physical quantities within the programmable machine's memories, registers and/or other such information storage, transmission and/or display element(s).

Unless specifically stated otherwise, as apparent from the following discussions, it is appreciated that throughout the specification discussions utilizing terms such as "measuring", "obtaining", "identifying", "splitting", "integrating", "calculating", "using", "taking", "normalizing", "calibrating", "finding". "receiving", "storing" or the like, include actions and/or processes of a computer that manipulate and/or transform data into other data, said data represented as physical quantities, e.g. such as electronic quantities, and/or said data representing the physical objects.

In the drawings and descriptions set forth, identical reference numerals indicate those components that are common to different embodiments or configurations. Elements in the drawings are not necessarily drawn to scale.

Handheld electronic device 1 and measuring module 150 are both computerized devices comprising or otherwise operatively connected to at least one computer processing unit configured for executing various operations as described below. The terms "processing unit", "computer", "processing device", or variations thereof should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and\or any combination thereof.

In embodiments of the presently disclosed subject matter, fewer, more and/or different stages than those shown in FIGS. 2, 4, 5 and 6 may be executed. In embodiments of the presently disclosed subject matter one or more stages illustrated FIGS. 2, 4, 5 and 6 may be executed in a different order and/or one or more groups of stages may be executed simultaneously.

Figure 1B:
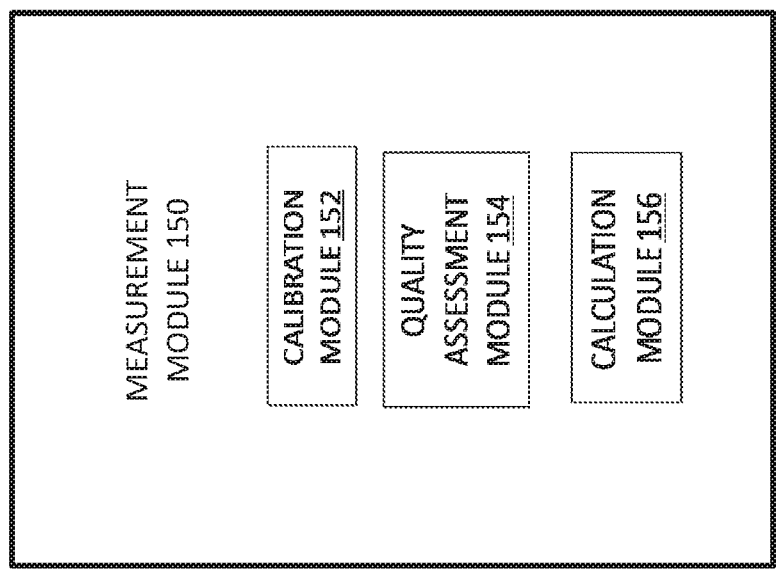
FIG. 1B is a functional block diagram illustrating the measurement module of the handheld electronic device of FIG. 1A, according to embodiments of the present disclosure.
Figure 1C:
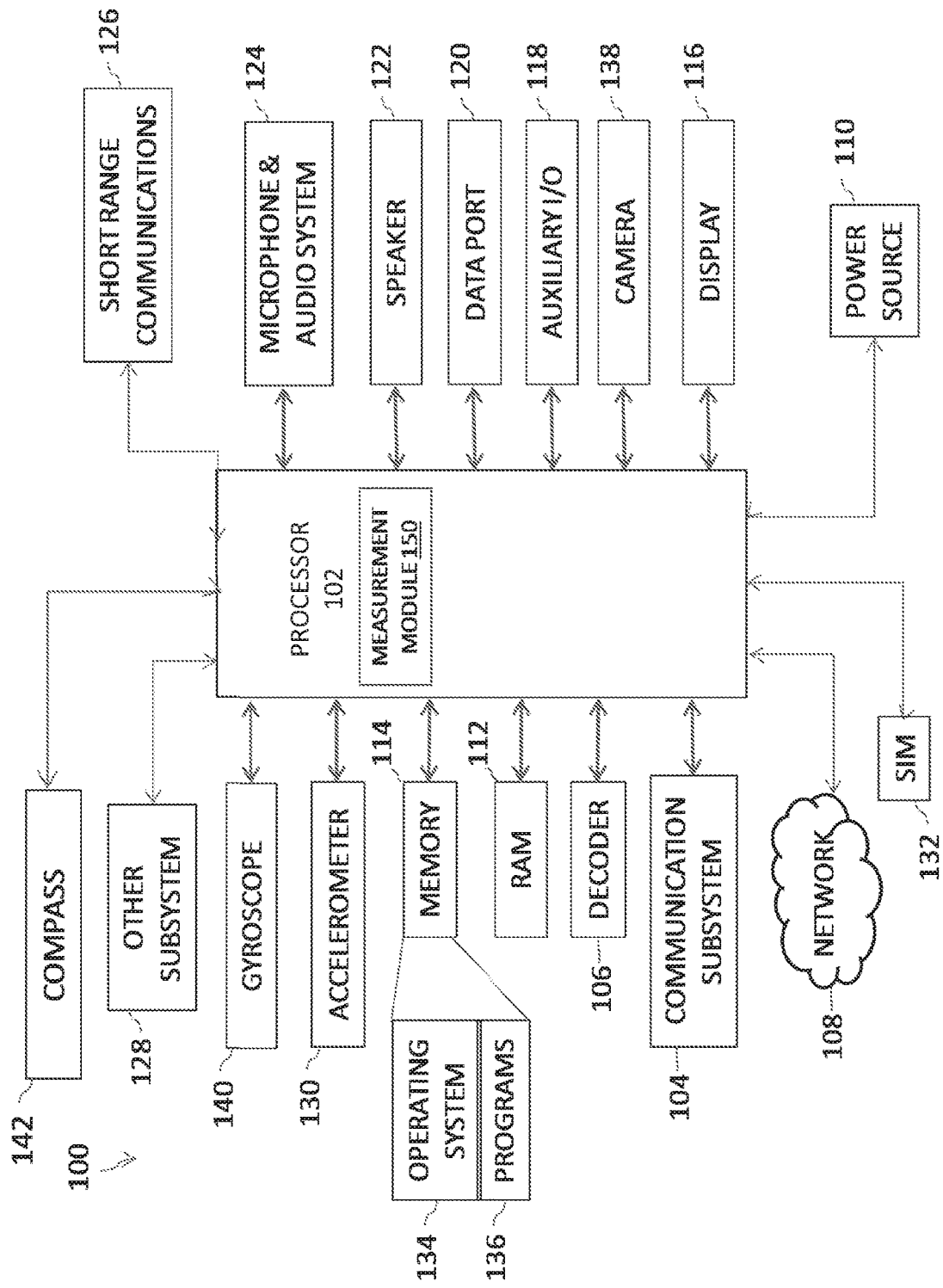
FIG. 1C is a functional block diagram illustrating the different units and modules of the handheld electronic device of FIG. 1A, according to embodiments of the present disclosure.

FIGS. 1A, 1B and 1C illustrate a general schematic of the system architecture in accordance with an embodiment of the presently disclosed subject matter. Functional elements in FIGS. 1A, 1B and 1C may be centralized in one location or dispersed over more than one location. In other embodiments of the presently disclosed subject matter, the system may comprise fewer, more, and/or different (e.g. distributed differently) functional elements than those shown in FIGS. 1A, 1B and 1C. For example, division in handheld electronic device 1 and measuring module 150 into the specified functional elements is done for the sake of example only and should not be construed as limiting in any way. For example, functional elements drawn as nested within other functional elements may be otherwise designed as independent functional units. In a specific example, measurement module 150 can be made according to different designs including: as an independent unit operatively connectible to various other functional units; as an integral part of handheld electronic device 1; and as integral part of processor 102.

Reference is now made to FIG. 1A. FIG. 1A is a schematic representation of a handheld electronic device 1 configured to measure a path length, according to the presently disclosed subject matter. In some examples, handheld electronic device 1 may have a substantially rectangular cuboid shape. Edges of handheld electronic device 1 may substantially define an orthogonal referential comprising three orthogonal axes X, Y, Z of handheld electronic device 1. According to a teaching disclosed herein handheld electronic device 1 can comprise a measurement module 150.

Reference is now made to FIG. 1B. FIG. 1B is a functional block diagram illustrating measurement module 150 of handheld electronic device 1 of FIG. 1A, according to an example of the presently disclosed subject matter. Measurement module 150 is configured to perform the measurement process herein disclosed. Measurement module 150 can further comprise a calibration module 152; a quality assessment module 154; and a calculation module 156.

Calibration module 152 is configured to perform the calibrations as disclosed herein. Quality assessment module 154 is configured to perform the quality assessments as disclosed herein. Calculation module 156 is configured to the calculation of a path length as disclosed herein. Measurement module 150, calibration module 152, quality assessment module 154, and calculation module 156 may be integrated as part of a processor (e.g., processor 102 described below with reference to FIG. 1C) and/or memory. Alternatively, measurement module 150, calibration module 152, quality assessment module 154, and calculation module 156 may be external to and operatively connected to a processor. The modules in FIG. 1B may be centralized in one location or dispersed over more than one location. A more detailed description of the various operations of the various modules is provided below.

Reference is now made to FIG. 1C. FIG. 1C is a functional block diagram of a handheld electronic device 1 of FIG. 1A, according to examples of the presently disclosed subject matter. FIG. 1C depicts a high-level functional block diagram of an electronic assembly 100 for operating handheld electronic device 1 according to the present disclosure. In some examples handheld electronic device 1 may be a smart-phone, computer tablet or smart-watch. Electronic assembly 100 can comprise processor 102, which can control the overall operation of handheld electronic device 1. In some examples, communication functions provided by handheld electronic device 1 can include voice, data, and command communications, which may be implemented by communication subsystem 104. Communication subsystem 104 can be used for example to initiate and support an active voice call or data communication session. Communication subsystem 104 can include various combinations of hardware, software, and firmware to perform various designated functions.

Data received by handheld electronic device 1 can be processed, including decompressed and decrypted, by decoder 106. Communication subsystem 104 can receive messages from, and send messages over, wireless network 108.

Power source 110 can provide power to operate and/or charge handheld electronic device 1, and can be implemented for example, with one or more rechargeable batteries, or a port to an external power supply, wherein such power supply provides the appropriate power to all components of electronic assembly 100.

Processor 102 can interact with other components, such as random access memory (RAM) 112, persistent memory 114, display 116, auxiliary input/output (I/O) subsystem 118, data port 120, speaker 122, microphone and audio system 124, short-range communications subsystem 126, and other subsystems 128. In some examples measurement module 150 is integrated with or operatively connected to processor 102. A user can enter data and operate functions of handheld electronic device 1 with a data input device coupled to processor 102. Data input devices can include for example one or more of: buttons, keypad, touch screen, or gesture sensitive user interface. Data input devices can further include a graphical user interface produced on display 116, which can use touches and gestures detected by a touch-sensitive overlay on display 116. Processor 102 can be configured to interact with the keypad and/or the touch-sensitive overlay via an electronic controller (represented in FIG. 1C by the element other subsystems 128). As part of the user interface, information, such as text, characters, symbols, images, icons, and other items that may be displayed or rendered on handheld electronic device 1, can be displayed on display 116. Processor 102 and memory 104 may be either separated from one another in separate units or integrated with each other in a single unit, e.g., a circuit board printed with instructions.

To identify and authenticate a subscriber for obtaining access to wireless network 108, handheld electronic device 1 can use a subscriber identity module (SIM) card 132. Alternatively, user identification information can be programmed into memory 114.

A received signal, such as a text message, an e-mail message, or web page download can be processed by communication subsystem 104 and input to processor 102. Processor 102 can process the received signal for output to the display 116 and/or to the auxiliary I/O subsystem 118. A wireless device user may generate data items, for example e-mail messages containing a photograph, which may be transmitted over wireless network 108 through communication subsystem 104. For voice communications, the overall operation of handheld electronic device 1 can be similar. Speaker 122 can be used to output audible information converted from electrical signals, and microphone and audio system 124 can be used to convert audible information into electrical signals for processing.

Camera subsystem 138 can include many hardware, software, and firmware modules that are needed to capture image data (e.g., visual data). Examples of image data include still photographs, and video frames included in the moving images of a video data file. For example, camera subsystem 138 can include lens 140, image sensor 142, and lens position controller 144. In certain examples, image sensor 142 may be a camera or a 3-D camera.

Handheld electronic device 1 can further comprise one or more accelerometers 130 (also referred to as acceleration sensor(s)). Processor 102 can be operatively connected to accelerometers 130, which may be used to detect a direction of gravitational forces and user-input acceleration threes.

The processor 102 may generally be operable to couple with the one or more accelerometers 130 to enable calculating or estimating a path length according to teaching disclosed herein. The one or more accelerometers 130 are each operable to measure an acceleration and provide data indicative of the measured acceleration. According to some examples, one or more of the accelerometers 130 may be operable to output an analog signal corresponding to an acceleration measurement. For instance, each accelerometer 130 may output an analog voltage signal that is proportional to measured accelerations. In some examples, the one or more accelerometers 130 may include any digital and analog components operable to generate a signal corresponding to a measured acceleration. The one or more accelerometers 130 may be any of a spring mass device, a servo device, a strain gauge, a resonance device, and the like. In some examples, the one or more accelerometers 130 may be configured to measure accelerations in three perpendicular directions, for each one of the orthogonal axes X, Y. Z of handheld electronic device 1.

Handheld electronic device 1 further comprises one or more gyroscopes 140 (also referred to as orientation sensor(s)), and a compass 142, such as a magnetometer, which may be used to detect the orientation of the handheld electronic device.

According to some examples, handheld electronic device 1 can include operating system 134 and software programs 136 which can both be executed by processor 102. Operating system 134 and software programs 136 can be stored for example, in a persistent, updatable format, such as memory 114. Additional applications or programs can be loaded onto handheld electronic device 1 through wireless network 108, auxiliary I/O subsystem 118, data port 120, short-range communications subsystem 126, or any other subsystem 128 suitable for transferring program files.

Software programs 136 may also include a Graphical User Interface (GUI) for interacting with a user and the module for calculating a path length. Each of these software modules can call upon various hardware and software resources within handheld electronic device 1 to execute a function. Additionally, functions described in the present disclosure can be implemented in various portions of electronic assembly 100, whether such portions are software modules, or specialized hardware and firmware modules. In many instances, it may be possible to implement the same function in more than one portion of electronic assembly 100.

In certain examples, handheld electronic device 1 can be capable of communicating over a communication link with other computer processing devices (not shown) arranged to help process data. For example, a smart-watch can be used as a measuring device whereas the computations will be performed on a smart-phone or tablet which is connected to the smart-watch via a communication link. Some operations may be performed remotely by these processing devices. The modules in FIG. 1C may be centralized in one location or dispersed over more than one location. In some examples the operations of various modules may be implemented remotely, for example, in a remote server. For example, the presently disclosed subject matter further contemplates a server connected to the measuring device (e.g. a smart-phone) via a remote communication link such as the Internet and configured to receive from the measuring device the measuring information and perform the various computations as disclosed herein. The results of the computations can be sent by the server back to the measuring device to be displayed and viewed by a user.

Figure 2:
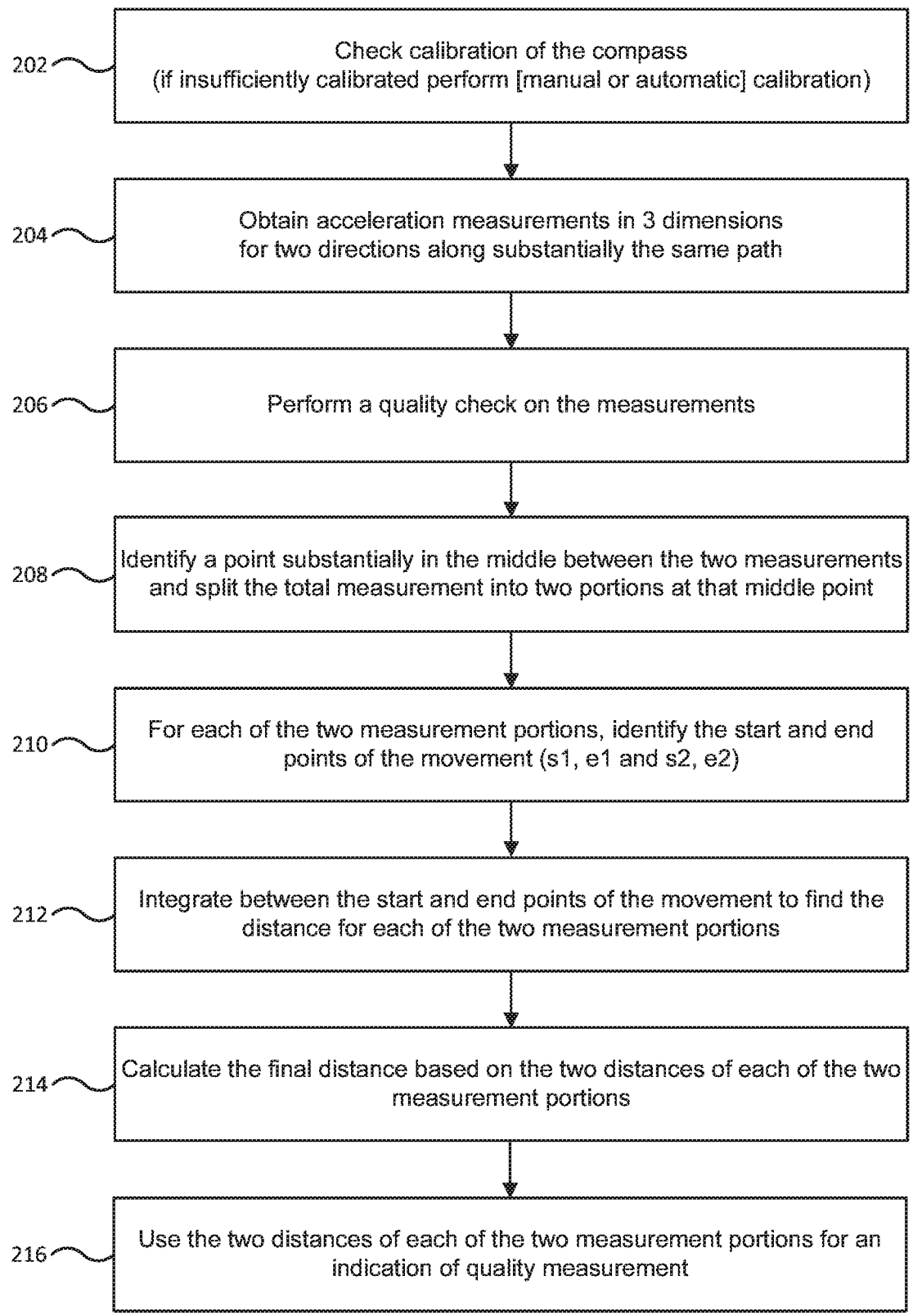
FIG. 2 is a flow chart illustrating a method of calculating a length of a path according to embodiments of the present disclosure.

Reference is now made to FIG. 2, FIG. 2 is a flowchart illustrating operations carried out for calculating a distance of a path length over a 3-dimensional (3-D) object, according to examples of the presently disclosed subject matter. Operations described with reference to FIG. 2 may be executed by handheld electronic device 1 described above with reference to FIGS. 1A, 1B and 1C. However, it should be noted that the specific design shown in these figures is for the sake of example only and should not be construed as limiting.

In block 202 the compass of the handheld electronic device is checked for a True North or Magnetic North calibration. According to one example, a magnet or a magnetometer together with a gyroscope inside handheld electronic device 1 is used as a compass 142 to determine the orientation of handheld electronic device 1 relative to the ground.

A preliminary calibration procedure may be carried out by calibration module 152 to check compass 142 in handheld electronic device 1 and determine whether compass 142 is sufficiently calibrated to True North or Magnetic North. In addition to determining the current level of calibration, during the preliminary calibration procedure it can be checked when the previous calibration was performed on handheld electronic device 1. If the calibration level is insufficient and/or the time since the previous calibration was performed is greater than a certain predefined time period, then the user can be requested to perform a manual calibration. The user can be prompted and instructed how to perform the calibration. In certain examples handheld electronic device 1 can be automatically calibrated to set compass 142 on handheld electronic device 1 to True North or Magnetic North using a calibration module 152 which is configured to communicate with the compass controls of handheld electronic device 1.

In block 204, acceleration measurements of handheld electronic device 1 are obtained for three dimensions (X, Y, Z) while handheld electronic device 1 is traversed over the path. In the following example, the case where handheld electronic device 1 is traversed over the path in a back and forth manner is described. However, in some examples handheld electronic device 1 is traversed over the path in only one direction. And in some examples handheld electronic device 1 is traversed over the path in a first direction and then again in that same direction.

In block 204, handheld electronic device 1 is traversed in a first direction along the path (from point A to point B) and then in a second reverse direction back along the path (from point B back to point A). The second direction (point B to point A) is symmetrically opposite to the first direction (point A to point B). According to some examples, acceleration sensors 130 and gyroscope 140 can be configured to obtain the measurements, and measurement module 150 can be configured to receive the measurements from the sensors. Handheld electronic device 1 can receive user input indicative of a starting and an ending of a traversing movement of handheld electronic device 1 over the path using a user input 128, described in further detail below.

Figure 3:
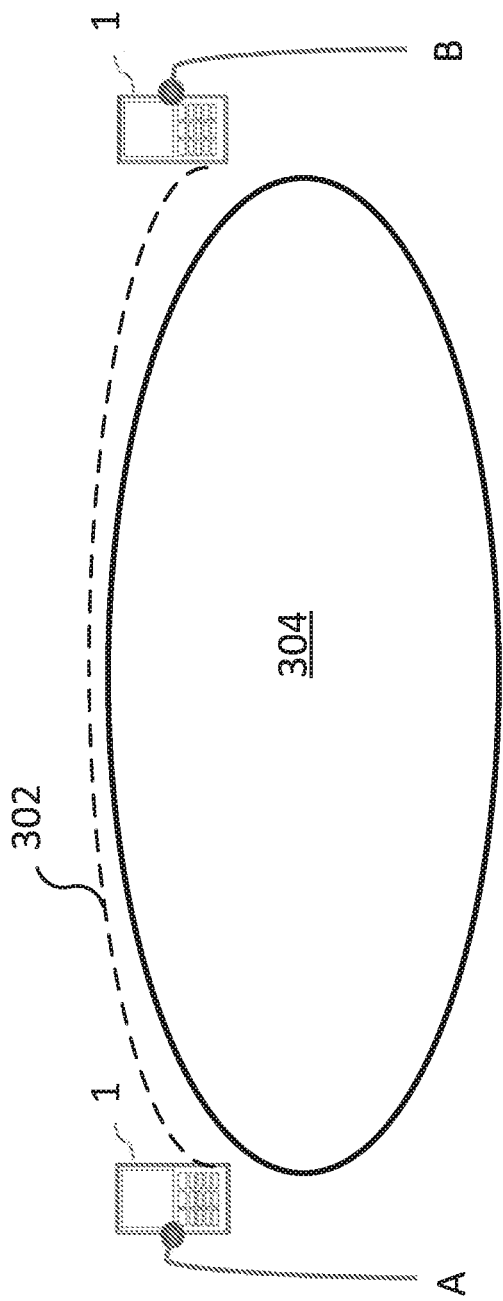
FIG. 3 illustrates a traversing movement of the handheld electronic device in a method of calculating a length of a path according to embodiments of the present disclosure.

Reference is now made to FIG. 3; description of FIG. 2 is continued below. FIG. 3 illustrates a traversing movement of handheld electronic device 1 in a method of calculating a distance of a path 302 on or over a surface of a 3-D object 304. Object 304 can be, for example, a body part or an article of clothing. Handheld electronic device 1 may be slid on (while being in contact with) object 304 or hovered over the surface of object 304 from a starting point A to an ending point B of path line 302.

There may be different starting position configurations, depending on the position of handheld electronic device 1 at the starting and ending points A, B. The starting position may depend on which of the dimensions (X, or Z) is defined as the dominant dimension for measuring.

Figure 4:
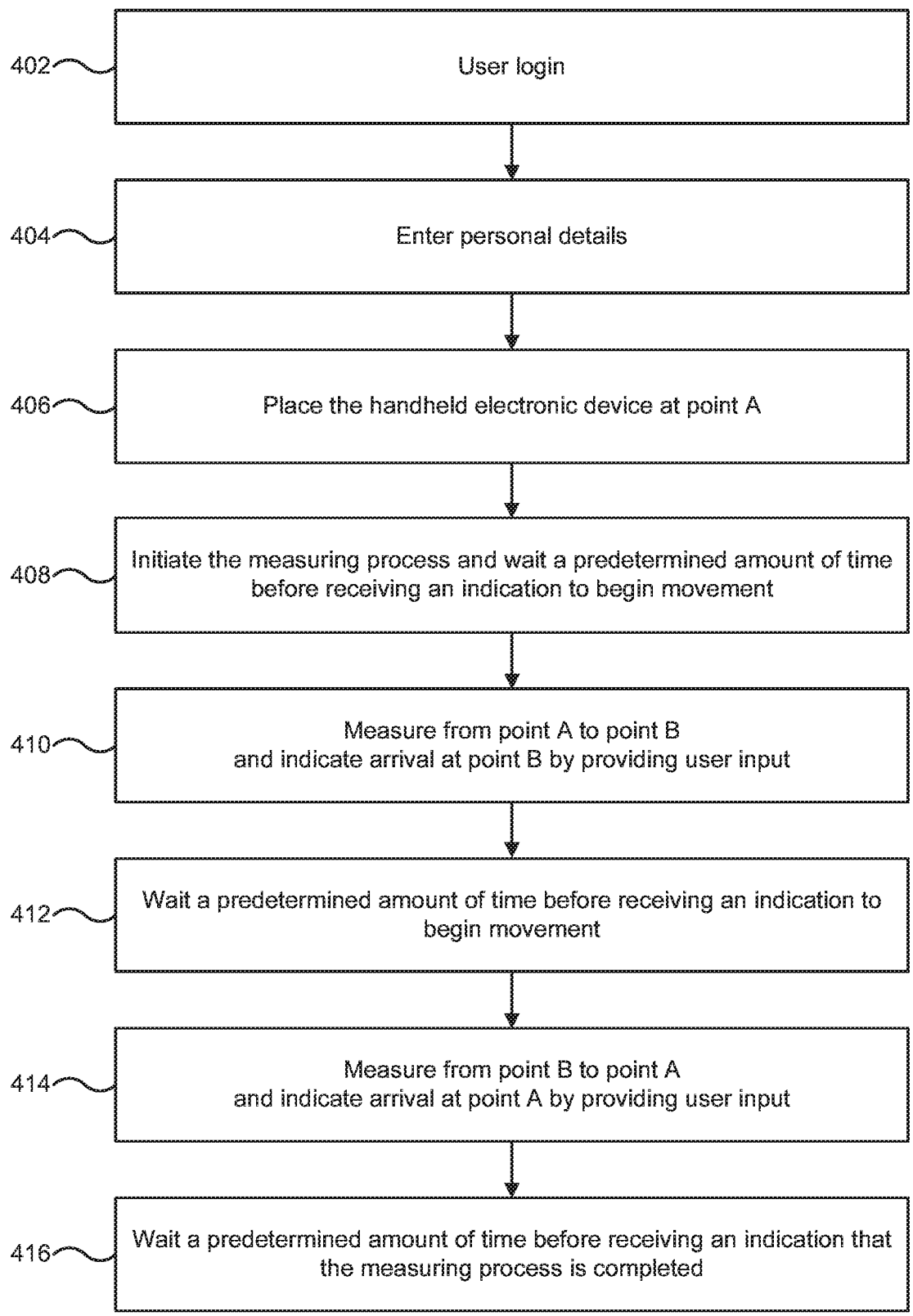
FIG. 4 is a flow chart illustrating a method of acquiring measurements, according to embodiments of the present disclosure.

Reference is now made to FIG. 4. FIG. 4 is a flow chart illustrating a method of acquiring measurements (which may be part of block 204, the block of obtaining measurements). In optional procedure 402 a user may in some examples log in, e.g., by providing a user name and password. In optional procedure 404 the user may be instructed to manually input one or more personal details, height or weight. The entered personal details may be measurements of paths that the user already knows, and therefore these paths will not necessarily have to be measured. In some examples, a sanity check may be performed (e.g., by quality assessment module 154) on the personal details input by the user, either before or after the final distance calculated (e.g., by measurement module 152). Of the three vectors (X, Y, Z) one of the three vectors is set as a predetermined dominant vector (e.g., X).

In procedure 406, the user is informed (e.g., by measurement module 150) of the dominant vector (e.g., X) and instructed how to hold and position handheld electronic device 1, using audio and/or visual instructions on display 116. The user may be instructed what portion of object 304 to measure, e.g. for an arm the user may be instructed to measure from a shoulder joint to a finger-tip, or for a garment the user may be instructed to measure along the waistline.

In procedure 408, the user is prompted (e.g., by measurement module 150) to initiate the measuring process by providing a user input (e.g. by pressing a button) using user input 128. The user is then instructed to wait a predetermined period of time (e.g., a certain number of seconds) before beginning movement of handheld electronic device 1 from point A (i.e., before measuring path 302 from point A to point B). The user is also instructed to indicate the arrival of handheld electronic device 1 at point B (e.g. by pressing a button or the same button again) and then to wait and remain stationary at point B for a predetermined period of time. In procedure 408, at the end of the period of waiting time an indication (e.g., visual and/or audio, for instance a beep sound) is provided to the user to inform the user to begin measuring and to move handheld electronic device 1 from point A to point B.

In procedure 410, the user then performs the measuring of path 302 by traversing handheld electronic device 1 in a first direction (from point A to point B) and then indicates the arrival of handheld electronic device 1 at point B by providing a user input (e.g. by pressing a button).

During the movement from point A to point B at least one sensor (e.g., accelerometer 130) is used to measure the acceleration for the three dimensions X, Y, Z along path 302 from point A to point B along object 304. At least one sensor (e.g., gyroscope 140) may be used to measure the orientation of handheld electronic device 1 for the three dimensions X, Y, Z along path 302 from point A to point B along object 304. Samples are taken of the acceleration and orientation for each dimension X Y, Z) at a certain set sampling interval or frequency during the time of the movement of handheld electronic device 1 and are received (e.g., by measurement module 150).

According to some examples, in procedure 412 the user is then instructed measurement module 150) to wait a predetermined period of time (e.g., a number of seconds) before measuring the return path from point B to point A. The user is also instructed (e.g., by measurement module 150) to indicate the arrival of handheld electronic device 1 at point A by providing a user input (e.g. by pressing a button or the same button again) and then to wait and remain stationary at point A for a predetermined period of time. In procedure 412, at the end of the period of waiting time an indication (e.g., visual and/or audio, for instance a beep sound) is provided (e.g., by measurement module 150) to the user to inform the user to begin measuring and to move handheld electronic device 1 from point B to point A.

In procedure 414, the user then performs the measuring of path 302 by traversing handheld electronic device 1 in a second, return direction (from point B to point A) symmetrically opposite to the first direction (from point A to point B). The user then indicates the arrival of handheld electronic device 1 at point A by providing a user input (e.g., by pressing a button). At least one sensor (e.g., accelerometer 130) is used to measure the acceleration for the three dimensions X, Y, Z along path 302 from point B to point A along object 304. At least one sensor (e.g., gyroscope 140) may be used to measure the orientation of handheld electronic device 1 for the three dimensions X, Y, Z along path 302 from point A to point B along object 304. Samples are taken of the acceleration for each dimension (X, Y, Z) at a certain set sampling interval or frequency during the time of the movement of handheld electronic device 1 and are received (e.g., by measurement module 150).

In procedure 416, the user is then instructed (e.g., by measurement module 150) to wait a predetermined period of time (e.g., a certain number of seconds) while remaining stationary at point A. In procedure 416, at the end of the period of waiting time an indication (e.g., visual and/or audio, for instance a beep sound) is provided (e.g., by measurement module 150) to the user to inform the user that they are no longer required to remain stationary at point A, thereby concluding the measuring process and obtaining acceleration plots for the 3 dimensions (Xacc, Yacc, Zacc) for the first direction (from point A to point B) and the second direction (from point B to point A) along path 302 on object 304 (e.g., in measurement module 150).

In addition to measuring the X, Y, Z values of acceleration of the movement (Xacc, Yacc, Zacc), the sensor(s) (e.g., the magnetometer) can also sense the X, Y, Z acceleration movement due to gravity (Xg, Yg, Zg). In some examples the sensor(s) can also sense the yaw, roll, and pitch of handheld electronic device 1. New X, Y, Z values of acceleration (Xacc, Yacc, Zacc) may be calculated (e.g., by calculation module 156) based on the X, Y, Z acceleration movement due to gravity (Xg, Yg, Zg) to provide compensated values of acceleration.

Returning now to FIG. 2, block 204 may thereby provide three acceleration plots (Xacc, Yacc, Zacc), each acceleration plot comprising a sequence of time stamped sampling points indicative of acceleration of the handheld electronic device between the starting point A and the ending point B for each of the three dimensions (X, Y, Z).

In block 204, additional calibration may optionally be performed on the X, Y, Z values of acceleration. In addition to compensating the X, Y, Z values of acceleration for the effect of gravity, the X, Y, Z values of acceleration may be normalized. Hereinafter, the term compensated will refer to the values after the effect of gravity has been removed and normalization has been done. According to some examples, calibration module 152 can be configured to carry out this calibration.

Optionally, in block 206, a quality check can be performed. For the X, Y, Z values of acceleration (Xacc, Yacc, Zacc) the X, Y, Z values of velocity are calculated by performing integration on the X, Y. Z values of acceleration (Xacc. Yacc, Zacc). The maximum velocity value is calculated using the maximum values of X, Y, Z values of velocity. The maximum velocity value is used as an indication of quality measure. If the maximum velocity value is less than a certain predetermined threshold, e.g., less than some predefined value, then the movement of the user of handheld electronic device 1 during the measurement process may be determined as too slow. Accordingly, in such a case the user may be prompted and instructed to perform the measurement process again from the beginning and at a higher speed. According to some examples, quality assessment module 154 can perform this quality check.

In block 208, a point substantially in the middle between the two stages of measurement (the point between measuring from point A to point B and from point B to point A) is identified and the total measurement for each dimension (X, Y, Z) is split into two portions at that middle point. According to some examples, calculation module 156 can be configured to identify the middle point and split the measurement into two portions.

Figure 5:
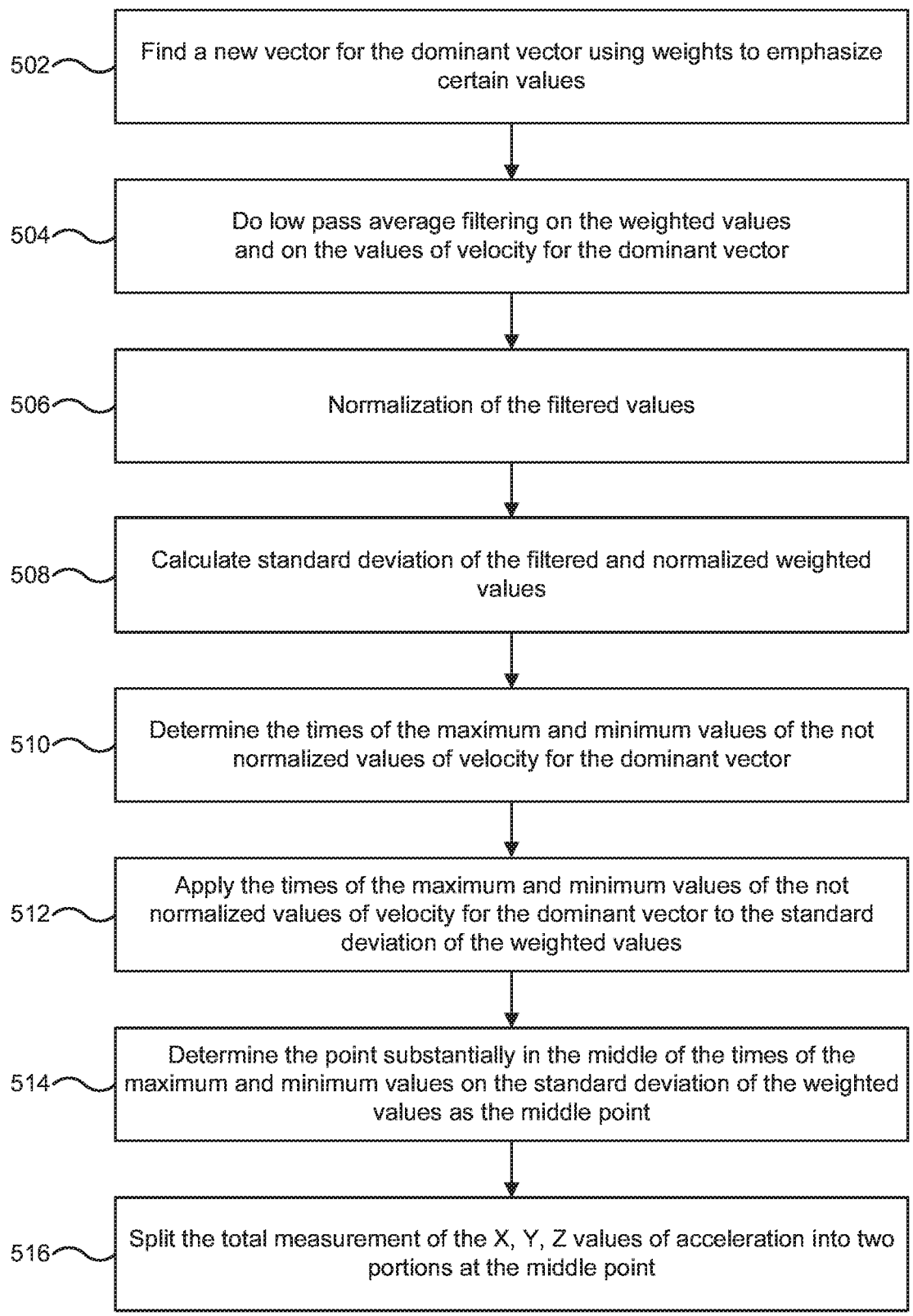
FIG. 5 is a flow chart illustrating a method of identifying a point substantially in the middle between the two measurements and splitting the total measurement into two portions at that middle point, according to embodiments of the present disclosure.

Reference is now made to FIG. 5; description of FIG. 2 is continued below. FIG. 5 is a flow chart illustrating a method of identifying a point substantially in the middle between the two measurements and splitting the total measurement into two portions at that middle point (which may be part of block 208). In block 502, according to some examples, a new vector for the dominant vector (e.g., X) is calculated (e.g., by calculation module 156) using weights to emphasize certain values of the X values of acceleration (Xacc).

Returning now to block 502 of FIG. 5, the weighting of the X values of acceleration (Xacc) may be done (e.g., by calculation module 156) using any appropriate weighting. According to one example, weighting of the X values of acceleration (Xacc) may be done by multiplying the compensated X values of acceleration (Xacc) by the absolute X values of velocity (ABS|Xvel|) to receive weighted X values (Xacc*|vel|). Alternatively, other weights may be used, such as multiplying the X values of acceleration (Xacc) by varying weights along the graph or plot of the X values of acceleration (Xacc) (e.g., low numbers at the start, and higher numbers near the middle point).

In block 504, a low pass averaging filter is used (e.g., by calculation module 156) on the weighted X values (Xacc*|vel|) and on the X values of velocity (Xvel).

The low pass averaging filter can be implemented for example by a sliding window of a predetermined time period (e.g. a predefined number of seconds). The low pass averaging filter determines the average of the vectors by moving the window of the filter by one sample of the graph at a time. The filtered results are less noisy.

In block 506, after filtering, normalization is done (e.g., by calculation module 156) on both of the filtered vectors, the weighted X values (Xacc*|vel|) and the X values of velocity (Xvel).

In block 508, a sliding standard deviation window of a predetermined time period is then used (e.g., by calculation module 156) on the normalized, filtered vector of the weighted X values (Xacc*|vel|) to calculate the standard deviation values (Xstd_dev). Where the changes are sharp in the weighted X values (Xacc*|vel|) the result is very high values, i.e., where the derivative of the weighted X value (Xacc*|vel|) is high.

In block 510, the times of the maximum and minimum values (tmax and tmin) of the not normalized X values of velocity (Xvel) are determined (e.g., by calculation module 156).

In block 512, the times of the maximum and minimum values (tmax and tmin) of the not normalized X values of velocity (Xvel) determined in block 510 are applied (e.g., by calculation module 156) to the standard deviation of the weighted X values (Xsts_dev) derived in block 508.

In block 514, the point substantially in the middle of the time of the maximum and minimum values (tmax and tram the graph of the standard deviation of the weighted X values (Xstd_dev) is determined as the middle point (S0) (e.g., by calculation module 156).

In block 516, the total measurement of the X, Y, Z values of acceleration (Xacc, Yacc, Zacc) is then split into two portions at the middle point (S0) (e.g., by calculation module 156).

Returning now to FIG. 2, at block 210, the start and end points of the movement, for each of the two portions derived from splitting the total measurement in block 208, are identified. According to some examples, calculation module 156 can be configured to identify the start and end points of movement. In certain examples, identifying the start and end points of the movement (s1, e1 and s2, e2) for each of the two portions is done using different weights for each of the two portions. For this purpose various types of weights can be used including for example: standard deviation, slope, and total acceleration.

Figure 6:
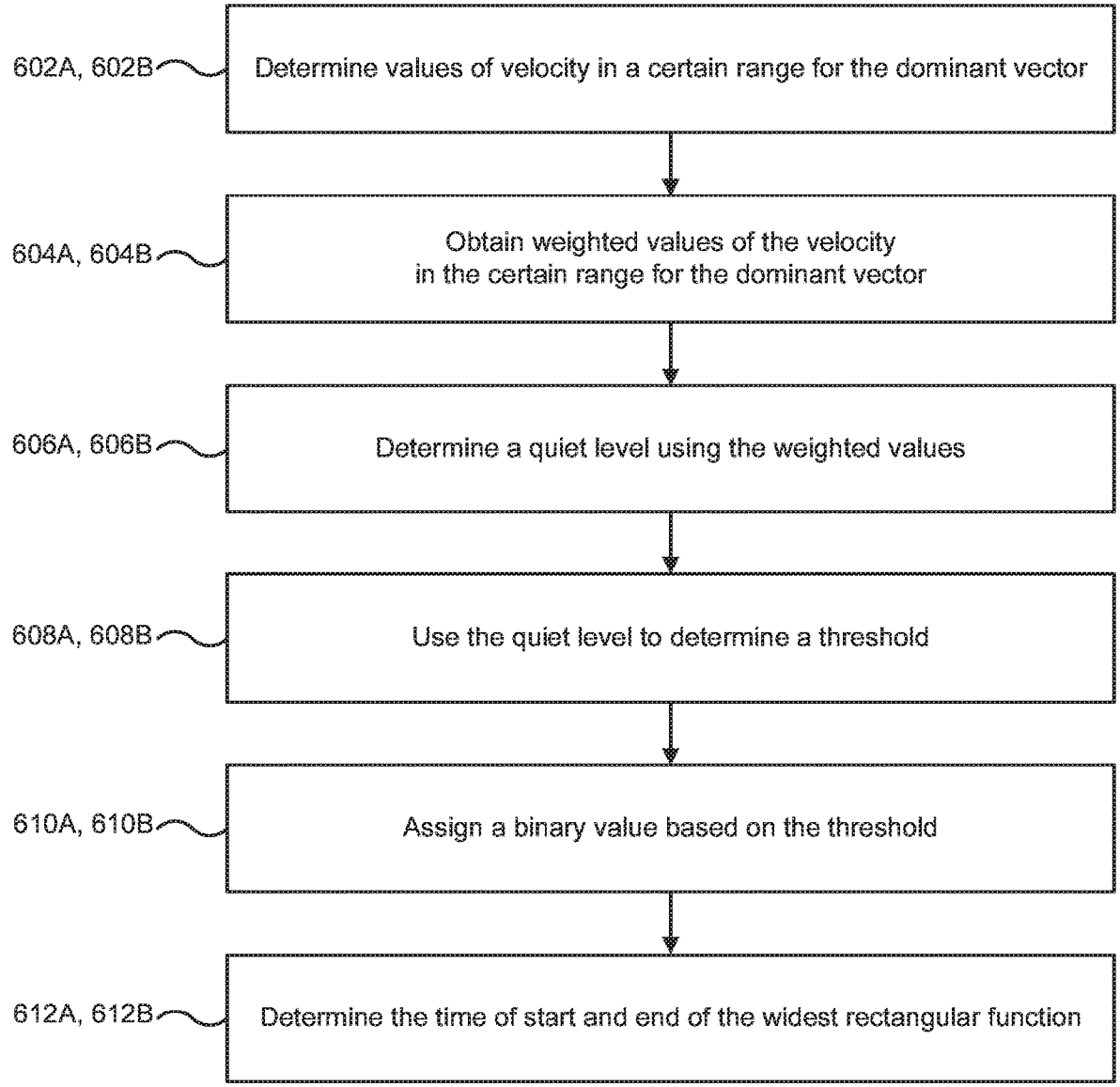
FIG. 6 is a flow chart illustrating a method of identifying the start and end points of the movement for each of the two portions, according to embodiments of the present disclosure

Reference is now made to FIG. 6; description of FIG. 2 is continued below. FIG. 6 is a flow chart illustrating a method of identifying the start and end points of the movement for each of the two portions (which may be part of block 210). In block 602A, according to some examples, for the first portion, from the beginning to the middle point (S0), the compensated absolute X values of velocity (Xvel), in a certain range are determined.

In block 604A, a sliding standard deviation window of a predetermined time period (e.g., a predefined number of seconds) is used (e.g., by calculation module 156) on the X values of velocity (Xvel) to calculate the standard deviation (Std). The standard deviation window calculates the difference between the samples. Where the changes are sharp (i.e., where the derivative is high) the result will be relatively high values. In place of a sliding window of standard deviation, other methods, such as a slope, could be used. The standard deviation (Std) is multiplied by the X values of velocity (Xvel) derived in block 602A to calculate a weighted graph of X values (Xvel*std). The weights are used to highlight low values that are near zero, since typically most of the measurement is in those areas.

In block 606A, an average window of a predefined time period (e.g., a predefined number of seconds) equal to or shorter than the predefined period of time before measurement is used (e.g., by calculation module 156) on the weighted values derived in block 604A to determine the quiet level for the first portion.

In block 608A, a certain percentage above or below the quiet level is determined (e.g., by calculation module 156) as a threshold, e.g., defined as a predefined percentage above the quiet level.

In block 610A, a binary value (0 or 1) is assigned (e.g., by calculation module 156) to the X values of velocity (Xvel) of the first portion based on the threshold. If the given value is below the threshold it is assigned a 0 value, and if the given value is above the threshold it is assigned a 1 value. The result is a vector for the first portion with one or more rectangular functions.

In block 612A, the time of the start and end of the widest rectangular function is determined (e.g., by calculation module 156) as the start and end points of the movement of the first portion (s1, e1). In some cases there will be more than one rectangular shape resulting in more than one pair of potential start and end points. More than one rectangular shape may be due to noise and/or stops in the movement by the user when the user is not supposed to stop. In this case all the pairs are examined and the widest pair is determined as the start and end points of the movement of the first portion (s1 and e1). In addition, sanity checks may be performed (e.g., by quality assessment module 154) on each of the pairs to see if that pair even needs to be considered at all. The time of the start and end of the widest pair (s1 and e1) will be applied to the compensated X values of velocity (Xvel) for the first portion. The area of the X values of velocity (Xvel) between s1 and e1 is the distance in the direction of the dominant dimension X for the first portion.

Different weights may be used on the second portion of the split measurement to identify the start and end points of the movement of the second portion (s2, e2). Using the same weights used on the first section for the second section may produce inadequate results.

In block 602B, according to some examples, for the second portion, from the middle point (S0) to the end, the compensated absolute X values of velocity (Xvel), in a certain range are determined (e.g., by calculation module 156).

In block 604B, for the second portion, the total acceleration (Ace) is calculated (e.g., by calculation module 156) using the X, Y, Z values of acceleration (Xacc, Yacc, Zacc). The total acceleration (Ace) is multiplied by the X values of velocity (Xvel) derived in block 602B to calculate a weighted graph of X values (Xvel*Acc). This weighted vector of X values (Xvel*Acc) for the second of the split portions is different than the weighted vector of X values (Xvel*std) for the first of the split portions since the weight is the total acceleration (Ace) and not the standard deviation of velocity (Std).

In block 606B, an average window of a predefined time period (e.g., a predefined number of seconds) equal to or shorter than the predefined period of time before measurement, is used (e.g., by calculation module 156) on the weighted values derived in block 604B to determine the quiet level for the second portion.

In block 6088, a certain percentage above or below the quiet level is determined (e.g., by calculation module 156 as a threshold), e.g., defined as a predefined percentage above the quiet level.

In block 610B, a binary value (0 or 1) is assigned (e.g., by calculation module 156) to the X values of velocity (Xvel) of the second portion based on the threshold. If the given value is below the threshold it is assigned a 0 value, and if the given value is above the threshold it is assigned a 1 value. The result is a vector for the second it) portion with one or more rectangular functions.

In block 612B, the time of the start and end of the widest rectangular function is determined (e.g., by calculation module 156) as the start and end points of the movement of the second portion (s2, e2). In some cases there will be more than one rectangular shape resulting in more than one pair of potential start and end points. More than one rectangular shape may be due to noise and/or stops in the movement by the user when the user is not supposed to stop. In this case all the pairs are examined and the widest pair is determined as the start and end points of the movement of the second portion s2 and e2). In addition, sanity checks may be performed (e.g., by quality assessment module 154) on each of the pairs to see if that pair even needs to be considered at all. The time of the start and end of the widest pair (s2 and e2) will be applied to the compensated X values of velocity (Xvel) for the second portion. The area of the X values of velocity (Xvel) between s2 and e2 is the distance in the direction of the dominant dimension X for the second portion.

Returning now to FIG. 2, at block 212, the area between the start and end points of the movement for each of the two portions (s2, e1 and s2, e2) derived in block 210 is integrated to calculate the length for each of the two portions. According to some examples, calculation module 156 can integrate these areas and calculate these lengths.

The start and end points of the movement for each of the two portions derived in block 210 for the dominant dimension (X) are applied (e.g., by calculation module 156) to the other dimensions (Y and Z). For the first portion, the normalized X, Y, Z values of velocity (Xvel, Yvel, Zvel) are integrated (e.g., by calculation module 156) between the start and end point of the movement of the first portion (between s1 and e1) to calculate the length for each dimension (dx1, dy1, dz1) for the first portion. In some examples, the calculated lengths for each dimension may be used (e.g., by calculation module 156) to calculate the length for the first portion (distAB). For the second portion, the normalized X, Y, Z values of velocity (Xvel, Yvel, Zvel) are integrated (e.g., by calculation module 156) between the start and end point of the movement of the second portion (between s2 and e2) to calculate the length for each dimension (dx2, dy2, dz2) for the second portion. In some examples, the calculated lengths for each dimension may be used (e.g., by calculation module 156) to calculate it) the length for the second portion (distBA).

In block 214, a final length based on the two lengths (distAB, distBA) derived in block 212 is calculated. In the previous procedure two scalar numbers, the distance between A-B and the distance between B-A (distAB, distBA) were determined. In some examples, the procedure of calculating a final length based on the two lengths is done (e.g., by calculation module 156) by taking the average of the two determined lengths.

The average can be determined as a final measurement of the length of path 302 over 3-D object 304. In some examples a differently weighted average may be used (e.g., by calculation module 156) to calculate the final measurement of the length of path 302 on/over 3-D object 304. According to some examples, calculation module 156 can be configured to perform this calculation, display 116 can be configured to display the results to a user, memory 114 can be configured to store the results, and communication subsystem 104 can be configured to transmit the results to another computer processing device, such as a server.

In optional block 216, the two distances (distAB, distBA) are used for an indication of quality measurement. For example, the difference between the two distances (distAB, distBA) is used for an indication of quality measurement. A predetermined threshold may be set, and if the difference between the two distances calculated for each portion (distAB, distBA) is too high above the threshold then it may be determined that the measurement performed was inadequate, and the user needs to perform the measurement again. According to some examples, quality assessment module 154 can be configured to perform this quality assessment.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory (including non-transitory memory) tangibly embodying a program of instructions executable by the machine for executing the disclosed method.

The invention claimed is:

1. A method of measuring a path over a three-dimensional (3D) object using a handheld electronic device comprising an acceleration sensor, the method comprising, using a processor for:
    responsive to a traversing movement of the handheld electronic device over the path in a first direction, responsive to sensing by the acceleration sensor an acceleration of the handheld electronic device, thereby measuring the acceleration, receiving from the acceleration sensor the acceleration measurements of the handheld electronic device;
    processing the acceleration measurements to generate acceleration plots for three (3) dimensions for the first direction;
    identifying a start point and an end point of the traversing movement, wherein said identifying the start point and the end point of the traversing movement is done using at least one first type of weight, wherein the at least one first type of weight is applied to values indicative of the acceleration measurements;
    integrating between the start point and the end point of the traversing movement; and
    determining a length of the path based on the integration.

2. The method according to claim 1, further comprising, responsive to a second traversing movement of the handheld electronic device over the path in a second direction, responsive to sensing by the acceleration sensor an acceleration of the handheld electronic device associated with the second traversing movement, thereby measuring the acceleration:
    receiving from the acceleration sensor the acceleration measurements in the second direction; and
    processing the acceleration measurements in the second direction to generate acceleration plots for three (3) dimensions for the second direction.

3. The method according to claim 2, wherein said second direction is symmetrically opposite to said first direction.

4. The method according to claim 2, wherein said second direction is similar to said first direction.

5. The method according to claim 2, comprising identifying a middle point substantially in a middle between the acceleration measurements in the first direction and the acceleration measurements in the second direction, and splitting the acceleration measurements in the first direction and the acceleration measurements in the second direction into a first portion and a second portion at said middle point.

6. The method according to claim 5, comprising identifying a start point and an end point of the second traversing movement for said second portion.

7. The method according to claim 6, comprising integrating between the start point and the end point of the second traversing movement for said second portion to find a length of said second portion.

8. The method according to claim 7, comprising calculating a final length based on a length of said first portion and the length of said second portion.

9. The method according to claim 8, wherein said calculating the final length based on the length of said first portion and the length of said second portion is done by averaging.

10. The method according to claim 7, comprising using a length of said first portion and the length of said second portion for an indication of quality measurement.

11. The method according to claim 7, comprising calibrating the acceleration measurements to compensate for an orientation inaccuracy.

12. The method according to claim 6, wherein said identifying the start point and the end point of the second traversing movement is done using at least one second type of weight, wherein the at least one second type of weight is applied to values indicative of the acceleration measurements in the second direction.

13. The method according to claim 12, wherein said at least one first type of weight is different from the at least one second type of weight.

14. The method according to claim 12, wherein said at least one first type of weight is similar to the at least one second type of weight.

15. The method according to claim 13, wherein the at least one first type of weight and the at least one second type of weight include any one of: standard deviation; slope; and total acceleration.

16. The method according to claim 1, comprising measuring orientation of the handheld electronic device utilizing an orientation sensor.

17. The method according to claim 1, comprising calibrating the handheld electronic device to True North or Magnetic North.

18. The method according to claim 1, comprising receiving user input indicative of a starting and an ending of the traversing movement of the handheld electronic device over the path.

19. The method according to claim 1, wherein said handheld electronic device is a smart-phone.

20. The method according to claim 1, comprising using angles data and orientation data to compensate the acceleration measurements for an effect of gravity.

21. The method according to claim 1, comprising transforming said acceleration measurements into binary data to identify the start point and the end point of the traversing movement.

22. A non-transitory computer-readable media storing computer-readable instructions that, when executed by a handheld electronic device traversed over a path on a three-dimensional object to be measured, cause the handheld electronic device to measure a length of the path by:

responsive to a traversing movement of the handheld electronic device over the path in a first direction, responsive to sensing by the acceleration sensor an acceleration of the handheld electronic device, thereby measuring the acceleration, receiving from the acceleration sensor the acceleration measurements of the handheld electronic device;

processing the acceleration measurements to generate acceleration plots for three (3) dimensions for the first direction;

identifying a start point and an end point of the traversing movement, wherein said identifying the start point and the end point of the traversing movement is done using at least one type of weight, wherein the at least one type of weight is applied to values indicative of the acceleration measurements;

integrating between the start point and the end point of the traversing movement; and determining the length of the path based on the integration.

23. A handheld electronic device configured to measure a path on a three-dimensional object, the handheld electronic device comprising:

an acceleration sensor configured to sense an acceleration of the handheld electronic device responsive to a traversing movement of the handheld electronic device over the path in a first direction, thereby measuring the acceleration;

computer memory; and a processor operatively coupled to the computer memory and to the acceleration sensor, wherein the computer memory includes instructions for causing the processor to:

receive from the acceleration sensor the acceleration measurements of the handheld electronic device;

process the acceleration measurements to generate acceleration plots for three (3) dimensions for the first direction;

identify a start point and an end point of the traversing movement, wherein the identifying the start point and the end point of the traversing movement is done using at least one type of weight, wherein the at least one type of weight is applied to values indicative of the acceleration measurements;

integrate between the start point and the end point of the traversing movement; and determine a length of the path based on the integration.

24. A measuring module for a handheld electronic device, the measuring module configured to measure a path on a three-dimensional object and comprising:

a user interface configured to receive user input indicative of a starting and an ending of a traversing movement of the handheld electronic device over the path;

a data receiver unit configured to, responsive to sensing by an acceleration sensor of the handheld device an acceleration of the handheld electronic device, thereby measuring the acceleration, the sensing being responsive to a traversing movement of the handheld electronic device over the path in a first direction:

receive from the acceleration sensor the acceleration measurements; and process the acceleration measurements to generate acceleration plots for three (3) dimensions for the first direction;

a data processing unit configured to:

identify a start point and an end point of the traversing movement, wherein the identifying the start point and the end point of the traversing movement is done using at least one type of weight, wherein the at least one type of weight is applied to values indicative of the acceleration measurements;

integrate between the start point and the end point of the traversing movement; and determine a length of the path based on the integration; and an output unit configured to output the length to a user.

* * * * *